D. F. COMSTOCK.
COLOR CINEMATOGRAPHY.
APPLICATION FILED DEC. 11, 1916.

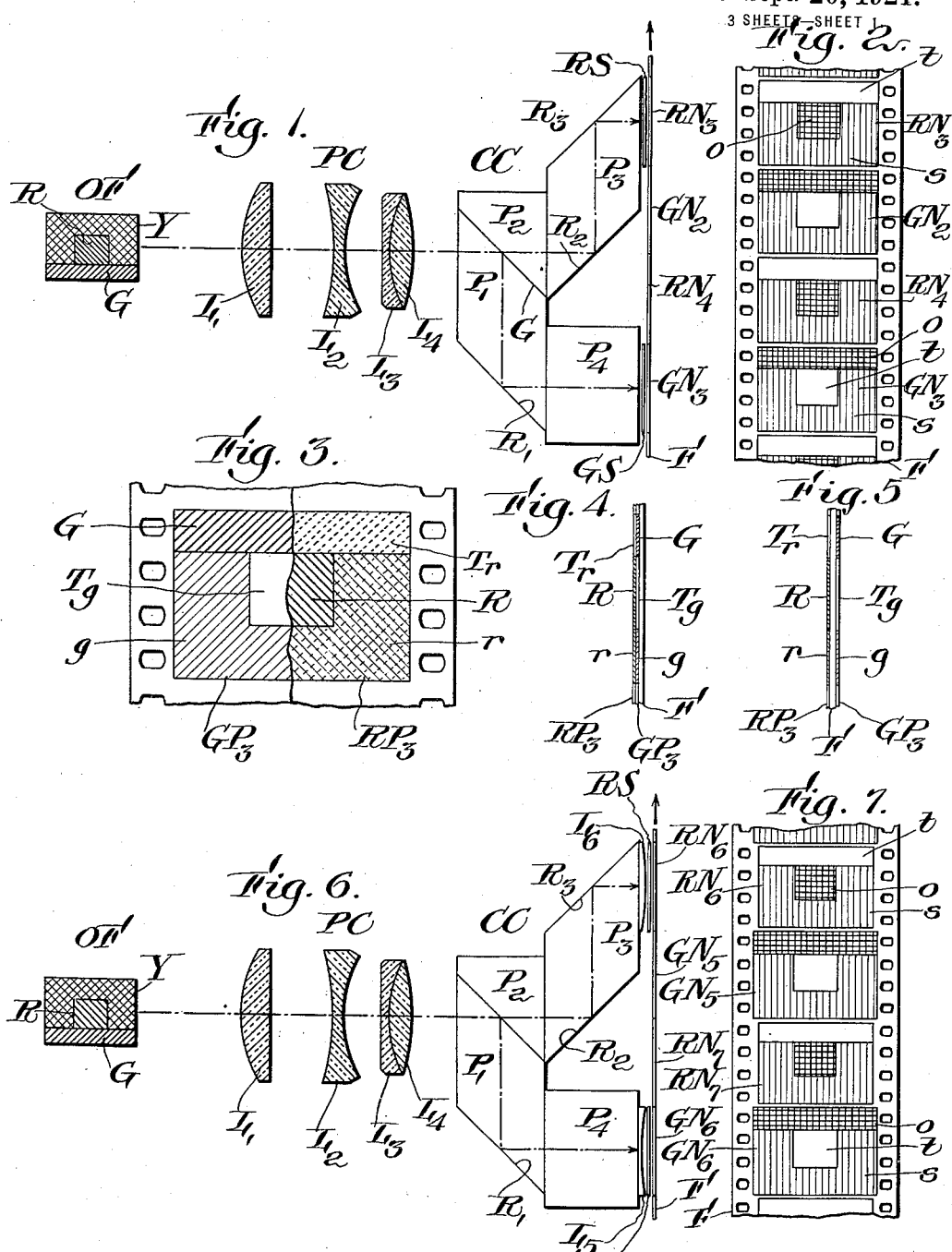

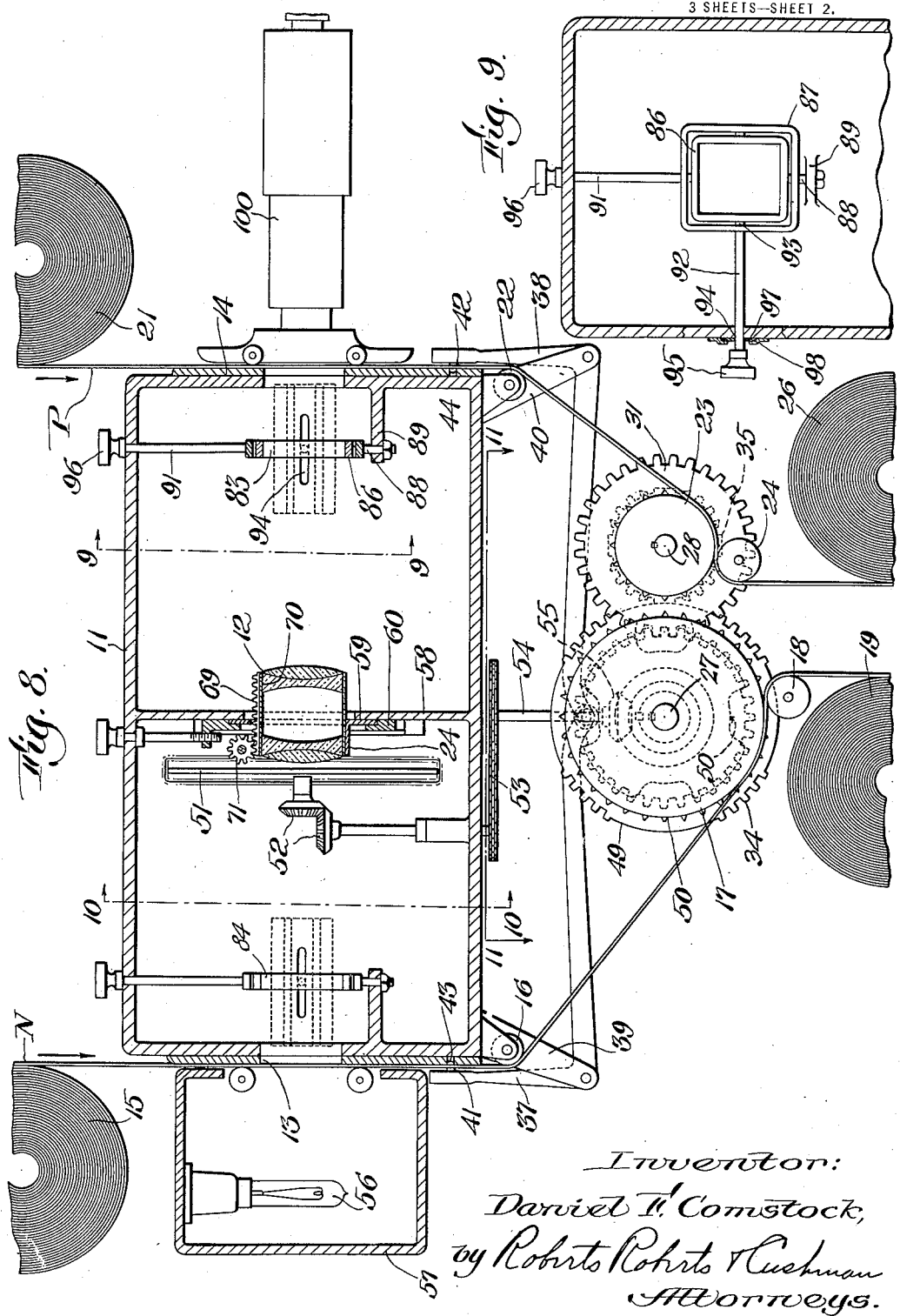

1,390,983.

Patented Sept. 20, 1921.
3 SHEETS—SHEET 3.

Inventor:
Daniel F. Comstock,
by Roberts Roberts & Cushman
Attorney.

UNITED STATES PATENT OFFICE.

DANIEL F. COMSTOCK, OF BROOKLINE, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

COLOR-CINEMATOGRAPHY.

1,390,983.                    Specification of Letters Patent.    Patented Sept. 20, 1921.

Application filed December 11, 1916. Serial No. 136,137.

*To all whom it may concern:*

Be it known that I, DANIEL F. COMSTOCK, a citizen of the United States, and resident of Brookline, in the county of Norfolk and State of Massachusetts, have invented new and useful Improvements in Color-Cinematography, of which the following is a specification.

This invention relates to the production of pictures of an object field in colors, and more particularly the invention relates to a motion picture transparency or picture strip, and to the method of and the apparatus for producing the same. The picture strip preferably comprises a plurality of registered or superposed complemental images, corresponding respectively to certain hues of the object field and representing concomitant aspects of the object; and the method preferably comprises producing complemental or geometrically similar negatives representing concomitant aspects of the object field, and producing in superposed relationship complemental or geometrically similar positives corresponding to the respective complemental negatives.

It has been proposed to produce motion pictures in colors by passing a beam of light through complemental images having dominant hues corresponding to certain hues of the object field, the distribution of the hues in the images corresponding to the distribution of the corresponding hues in the object field, and thereby absorbing, in the proper distributive and varying amounts throughout the image field, the light components of the beam other than those adapted to produce the pictures in the respective hues, that is, in the dominant hues of the images and in the various gradations of hues formed by various proportions of the dominant hues. It has also been proposed to mount these geometrically similar images in super-position on a transparent support.

One method of producing a transparency having superposed images of the character referred to has been to expose, from a single point of view, alternate negatives through colored screens having complemental dominant hues, thereby forming two or more series of negatives corresponding respectively to different complemental hues of the object field, the negatives of the respective series alternating with each other; printing from one of the series of negatives a series of positives on a sensitized emulsion of a transparent support; and printing from a second of the series of negatives a series of positives on a second sensitized emulsion of the transparent support, the adjacent complemental negatives being printed in superposition on the positive transparency.

It is obvious that the superposed complemental positives formed by this method do not represent concomitant aspects of the object field, inasmuch as the negatives employed in producing the positives represent succeeding aspects of the object field and not coexisting aspects. Where there are moving objects in the field, as is ordinarily the case, the aspect of the field may change substantially during the time intervening between the exposure of the respective complemental negatives. Consequently the superposed positives printed from these negatives do not register and the pictures produced by projecting light successively through the complemental positives have markedly objectionable fringes of color around the edges of the colored objects, the effect being similar to the well-known fringe phenomenon encountered in successively projecting through suitable color screens single positives printed from complemental negatives exposed in succeeding time intervals.

Another method of producing a series of superposed positives has been to employ two juxtaposed lens systems and thereby simultaneously expose pairs of complemental negatives from which two series of complemental positives may be printed in superposition as outlined above. But where the complemental negatives are exposed in this manner they obviously represent different aspects of the object field and, due to parallax, positives printed in superposition from such negatives do not afford images which accurately register on the screen. Other similar methods have been proposed, but they have each been characterized by at least one of the above mentioned faults or by some other prohibitive imperfection.

Furthermore, a material amount of shrinkage of the positive film takes place in the process of developing the first series of positives, before the second series of positives has been printed, and when the images of both series of negatives are made of the same size, as has heretofore been done, the last printed positives will be larger than the first printed positives, in the finished film, owing to the shrinkage of the first positives in the first developing process before the formation of the second series of positives. While the film will again shrink to some extent during the process of developing the second series, both series of positives will shrink the same amount the second time inasmuch as they are both fixedly secured to the transparency, and the relative differences in size between the positives of the first series and the positives of the second series will be substantially the same when the picture strip is completed as at the time of printing the second series. Consequently, since the superposed complemental images of the completed picture strip are of unequal size, the images do not register and pictures produced by projecting a beam of light successively through the images will be blurred and will show fringes of color.

Moreover, where the emulsions employed in forming the respective series of positives are on opposite sides of the film, which is ordinarily of approximately five-thousandths of an inch in thickness, the complemental positives are magnified to different degrees owing to the fact that they do not lie in the same plane. Under such circumstances it is desirable to have the complemental positives of slightly different dimensions in order to compensate for the different degrees of magnification, although the degree of difference resulting from the different number of shrinkages of the respective series of positives is ordinarily in excess of the amount required for magnification compensation.

The objects of the present invention are to provide a superposed complemental positive film and method of and apparatus for making same such that the complemental positives represent concomitant or coexisting aspects of the object field, and from the same point of view; that the pictures produced by projecting a beam of light successively through the complemental images may be of substantially the same size, and therefore accurately registerable, notwithstanding different degrees of shrinkage of the respective series of positives in the process of producing the transparency; and, where the distance between the planes of the respective positives is substantial, such that the pictures produced by projecting a beam of light successively through the images may be of substantially the same size, and therefore accurately registerable, notwithstanding the difference in magnification of the respective images due to their spaced relationship.

Other objects of the invention are to provide methods of and means for printing motion pictures by projection, printing superposed pictures in accurate registration by projection, laterally positioning the projection means and one or both films with respect to each other thereby accurately to position the projected image upon the positive film, synchronously advancing the films in spaced relationship, intermittently advancing one film a plurality of picture spaces at a time while advancing the other film a different number of picture spaces at a time, either laterally or longitudinally or both laterally and longitudinally positioning each film during printing intervals independently of the other film and preferably independently of the film advancing means, laterally positioning the projected image upon the positive film by deflecting the projected beam of light, viewing the image on the positive film while it is being printed, accurately printing images in superposition by viewing the two images during the printing intervals, or accomplishing any one of these functions individually or any group of the functions conjunctively.

Other objects of the invention will be apparent from the following description read in the light of the accompanying drawings, in which—

Figure 1 is a diagram showing one system for forming the complemental negatives;

Fig. 2 is a diagram illustrating the developed negatives produced by the system of Fig. 1;

Fig. 3 is a diagram of a positive having superposed images, the uppermost image of which is partially broken away;

Fig. 4 is a longitudinal section through a transparency in which the superposed complemental positive images are disposed on the same side of the transparent supporting medium;

Fig. 5 is a longitudinal section of a positive having the superposed complemental images mounted on opposite sides of the transparent supporting medium;

Fig. 6 is a diagram illustrating apparatus for producing complemental negatives of different sizes;

Fig. 7 is a diagram illustrating a developed negative exposed by means of the apparatus illustrated in Fig. 6;

Fig. 8 is a vertical longitudinal section of a modified form of my invention, parts being shown in elevation;

Fig. 9 is a section on line 9—9 of Figs. 8, parts being omitted;

Figure 10:
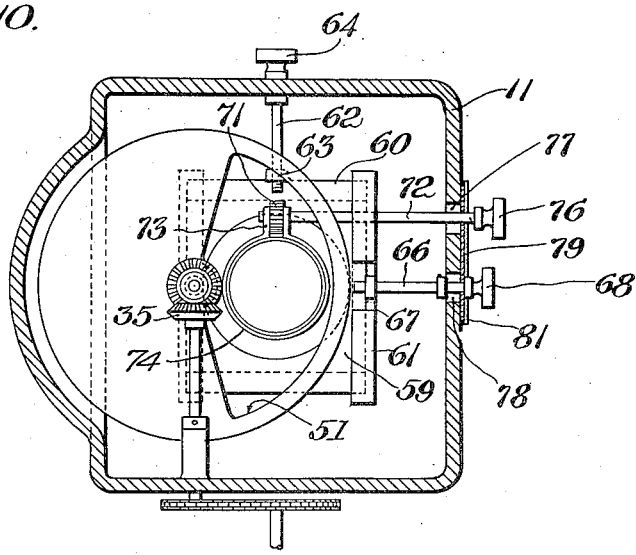
Fig. 10 is a vertical transverse section on line 10—10 of Fig. 8, parts being omitted and a part of one side of the casing being broken away.

The form of apparatus illustrated in Fig. 1 for producing complemental images which are accurately of the same size and which are simultaneously exposed from the same point of view, is similar to that disclosed in my application Sr. No. 121,931, filed Sept. 25, 1916, and comprises a positive lens component PC and a composite component CC, the latter constituting light-dividing means and including prisms $P_1$, $P_2$, $P_3$ and $P_4$. Between the prisms $P_1$ and $P_2$ is inserted a light-dividing grid which is preferably formed in accordance with my Patent No. 1,231,710, granted July 3, 1917, and which comprises small irregular spots of reflecting material irregularly disposed throughout the area defined by the juxtaposed faces of the prisms the reflecting surface comprising substantially one-half of the total surface whereby substantially one-half of the light entering the prisms passes directly through the grid G to the reflecting surfaces $R_2$ and $R_3$, and the other half of the light is reflected to the reflecting surface $R_1$. In the path of the transmitted component of light is disposed a red color-screen RS and in the path of the reflected component of light is disposed a green color-screen GS. The film F is intermittently advanced along the path indicated by the arrow so that complemental negatives $RN_1$, $GN_1$, etc., are formed by the red and green components of light, respectively, upon picture spaces of the film which are spaced apart by two picture spaces as illustrated. The film is intermittently advanced two picture spaces at a time whereby all the picture spaces are exposed to one or the other component of light.

The cardinal feature of the lens system shown in Fig. 1 is that the lenses $L_1$, $L_2$, $L_3$, and $L_4$, comprising the positive component of the system, are so designed with reference to the composite component CC, consisting of the prisms $P_1$, $P_2$, $P_3$ and $P_4$, that the entire lens system is astigmatically, spherically and chromatically corrected, all as fully disclosed in application Sr. No. 121,931, above cited. This unitary lens system produces complemental negatives which are exactly similar and which are free from aberrations by which the prior uncorrected systems of this general type have been characterized.

Considering, for example, an object field OF such as illustrated in Fig. 1 comprising a red portion R, a green portion G and a yellow portion Y, the complemental negatives formed by the apparatus of Fig. 1 will, when developed, appear as illustrated in Fig. 2. Each of the negatives formed by the red sensation, that is negatives $RN_1$, $RN_2$, etc., will consist of relatively opaque portions $o$ corresponding to the red portion of the object field, as will be readily understood, while the upper portion of the negatives corresponding to the green portion of the object field will be relatively transparent. The portion $s$ of the red negative, corresponding to the yellow portion of the object field, will be semi-transparent inasmuch as the light from the yellow portion of the object field has a red component which passes through the red color-screen RS and partially exposes the portion $s$ of the red negatives. Each of the negatives $GN_1$, $GN_2$, etc., corresponding to the green sensation from the object field comprise a central transparent portion $t$ corresponding to the red portion of the object field, a relatively opaque portion $o$ corresponding to the green portion of the object field, and a semi-transparent portion $s$ corresponding to the yellow portion of the object field.

A positive produced by complemental negatives formed as above described, is illustrated in Figs. 3 and 4. This positive is formed by coating the film F upon one side with a suitable sensitive emulsion, then printing upon this sensitive emulsion from the series of negatives $RN_3$, $RN_4$, etc., corresponding to the red sensation of the object field, positives in juxaposition and in alinement lengthwise of the transparency. After the series of positive thus printed is developed and fixed in the ordinary way, each of the positives, as for example the positive $GP_3$ shown in Figs. 3, 4 and 5, will consist of a relatively dense portion G of black precipitated silver corresponding to the transparent portion $t$ of the red negative, a very thin portion $T_g$ corresponding to the relatively opaque portion $o$ of the negative, and a portion $g$ of intermediate density corresponding to the semi-transparent portion $s$ of the negative. After the first series of positives is developed the images are toned in a suitable manner to give them a color approximately complementary to that of the red color-screen through which the corresponding negatives were exposed, for example green. Each of these positives will then consist of a thick green portion G, a relatively transparent portion $T_g$ and a thin green portion $g$.

A second sensitive emulsion is then applied to the film either on the same side of the film upon the first coating as shown in Fig. 4, or on the opposite side of the film as shown in Fig. 5. From the negatives produced by the green sensation, positives are printed upon the second emulsion in superposition and in registration with the first series of positives corresponding to the red sensation, the resulting superposed positives corresponding respectively to the complemental negatives taken simultaneously from the same point of view, as illustrated in Figs. 1 and 2. The second emulsion is developed and fixed and the images are then toned so as to give them a color complementary to that of the first series of positives, for example red. Each of the second positives, such as $RP_3$, will then comprise a relatively transparent portion $T_r$ corresponding to the relatively opaque portion $o$ of negative $GN_3$, a dense red portion R corresponding to the transparent portion $t$ of the negative, and a comparatively thin red portion $r$ corresponding to the semi-transparent portion $s$ of the negative.

Whether the positives be disposed on the same side or on opposite sides of the film, a beam of light projected successively through the superposed complemental images will produce upon a screen an accurate representation of the object field in at least approximately its true colors, and owing to the fact that the negatives employed in producing the positives are taken simultaneously and from the same point of view, the positives produced therefrom are exact complements of each other and, if in accurate registration, the images produced on the screen by projecting a beam of light successively through both positives will be in accurate registration.

While the above method and article are improvements over the prior art, I have made further improvements in order to compensate for the different degrees of shrinkage of the respective series of positives and, when desired, to compensate for the different degree of magnification of the respective positives due to their disposition in defferent planes. Instead of forming the complemental negatives of exactly the same size as illustrated in Fig. 2, I propose to form them of slightly different size as illustrated in Fig. 7. In printing the positives I first print from the series of negatives of larger dimensions, as for example the negatives $GN_5$, $GN_6$, etc. corresponding to the green sensation of the object field, and this series of positives is then developed, fixed and toned as above described. The second emulsion is applied to the film and the second series of positives is printed from the other series of negatives $RN_6$, $RN_7$, etc., which are of smaller size and which correspond to the red sensation of the object field. The difference in size of the negatives of the respective series is so determined that when the positives are produced in superposition they will either be exactly of the same size, or they will be of sufficiently different size to compensate for the different degree of magnification resulting from the superposed relationship of the positives.

Suitable apparatus for producing complemental negatives of different dimensions is illustrated in Fig. 6, this apparatus being similar to that shown in Fig. 1 except that lenses $L_5$ and $L_6$ are added to the lens system. The lens $L_5$ is a plano-concave lens having a focal length of 16 inches and an index of refraction of 1.52, and the plano-convex lens $L_6$ also has a focal length of 16 inches and an index of refraction of 1.52. These lenses are positioned in the paths of the respective components of light issuing from the prisms $P_1$, $P_2$, $P_3$ $P_4$, and while it is immaterial in which path each of the lenses is placed, it is obvious that the negatives formed by the component of light passing through the positive lens will be of smaller dimensions than the negative produced by the component of light passing through the negative lens.

Instead of providing two lenses such as $L_5$ and $L_6$, a single lens may be provided in the path of one of the components of light and be formed of twice the power of either of the lenses $L_5$ and $L_6$, whereby each of the negatives of one series will be either enlarged or contracted twice as much as the negatives are respectively enlarged and contracted by the two lenses $L_5$ and $L_6$. However, it is desirable to provide two lenses, one in the path of each component of the image-bearing beam, for the reason that this reduces the power of each lens one-half and thereby reduces the distortion of the images about one-fourth the value of that produced by a single lens of twice the power of each of the two lenses. Furthermore, by positioning the lenses adjacent to the image plane, the distortion of the positive lens can be made to match very closely the distortion of the negative lens. While the additional lens or lenses may be positioned more remotely from the film, as for example between the prisms $P_2$ and $P_3$ or between the prisms $P_1$ and $P_4$, it is highly desirable to place them as close to the film as possible inasmuch as the distortion produced by them is thereby practically eliminated. For this reason I preferably either mount the lenses $L_5$ and $L_6$ on the forward faces of the prisms $P_4$ and $P_3$, respectively, or form the lenses on the faces of the prisms as an integral part thereof, next to the film. With lenses as above described, the negatives of the respective complemental series will differ in size by about one per cent.

While I have only described one way of producing the superposed color positive in the method hereinbefore described, it is to be understood that this step of the method may comprise any suitable manner of producing color positives from negatives as, for example, by any photo-chemical or mechanical process, or by printing negatives from positives printed from the complemental negatives, and toning the printed negatives by any suitable method, such as the well-known kodachromie process, involving a reversal of the negatives.

In accordance with certain of the above mentioned objects of my invention I also propose to produce a transparency of the character described by producing a plurality of complemental series of negatives and printing positives from the negatives by synchronously advancing the films in spaced relationship and projecting the images from the negative film to the positive film across the space intervening between the films. This method, when employed to produce a transparency having superposed positives, affords a convenient way of printing the respective series in different sizes, thereby to compensate for shrinkage of the positive film during the interval between the printing of the respective series. Furthermore, it affords a more flexible manner of printing the positives in different sizes inasmuch as the correct relative sizes of the complementary images need not be determined until the positives are printed, and inasmuch as the size of the positives can be accurately regulated during the printing process.

This method also comprises accurately positioning the latent images on the positive film in a manner wholly impossible with the ordinary methods of contact printing. This phase of the method involves separately positioning the negative and positive films during the printing process, refracting or otherwise deflecting the beam of light intermediate the two films, or both. A sub-combination of the method comprises printing an image in superposition to a visible image in such manner that the two images can be simultaneously viewed and accurately registered during the printing process.

The modified embodiment of my invention illustrated in Figs. 8 to 11, comprises one means for carrying out the method referred to in the two preceding paragraphs. The lens chamber 11 containing lens 12 is provided with a film gate 13 at its left end and a film gate 14 at the right end, these two film gates being in geometrical alinement with each other and with the lens 12 although the only requirement is that these three elements be in optical alinement. The negative film N is fed through the film gate 13 from a magazine (not shown) over roller 15 and thence outwardly from the film gate over roller 16 to sprocket wheel 17, roller 18, roller 19 and thence to a take-up reel (not shown). The positive film P is arranged to be fed through the film gate 14 from roller 21, outwardly from the film gate over roller 22, sprocket wheel 23, roller 24, roller 26 and thence to the take-up reel (not shown).

Figure 11:
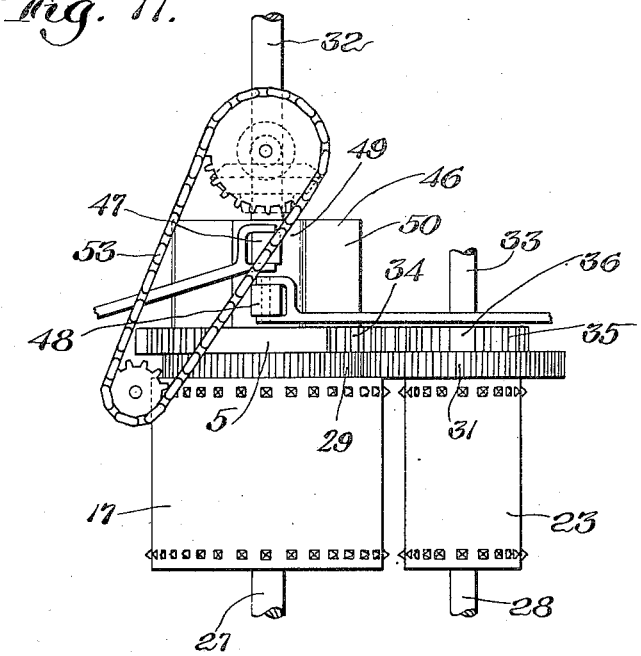
Fig. 11 is a section on line 11—11 of Fig. 8, parts being omitted.

The mechanism for feeding the two films through the film gates preferably comprises means for feeding them in synchronism and intermittently at different rates, in accordance with one object of the invention, namely, printing positives in superposition on one film from negatives disposed in alinement on another film. The particular means for feeding the films illustrated in the drawings comprises parallel shafts 27 and 28 positively connected together at their ends by means of spur gears 29 and 31 (Fig. 11). In alinement with the shafts 27 and 28 are two other shafts 32 and 33 carrying at their forward ends mutilated spur gear wheels 34 and 35 constituting intermittent transmission gearing. The mutilated gear 34 has four series of gear teeth, each series occupying substantially one-eighth of the periphery of the gear wheel and the respective series being spaced apart by approximately equal distances, namely, one-eighth the circumference of the wheel. The gear wheel 35 is provided with four series of gear teeth uniformly spaced about the gear wheel and respectively separated by a broad concave tooth 36 adapted accurately to fit against the convex portions 5 of the gear wheel 34 disposed between the series of teeth thereon. The shaft 32 is connected with a source of power (not shown) and is arranged to be driven continuously in a counterclockwise direction. The shaft 33 is thus driven intermittently by means of the mutilated gears 36 and 35, a series of teeth on gear 34 meshing with a series of teeth on gear 35 thus rotating the shaft 33 through one-quarter of a revolution, and tooth 36 then engaging the convex portion 5 of gear 34 holding the shaft 33 in stationary position during one-eighth of a revolution of gear 34, another series of teeth on gear 34 then engaging the next series of teeth on gear 35, and thus intermittently rotating the shaft 33 one-quarter of a revolution at a time. The shafts 33 and 28 are integrally or otherwise connected together so that the gear wheel 31 and sprocket wheel 23 mounted on shaft 28 are intermittently rotated one-quarter of a revolution at a time. The sprocket wheel 17 is intermittently rotated in synchronism with sprocket 23 through the medium of gear wheels 29 and 31. The sprocket wheels 17 and 23 are of different size and in the particular embodiment of the invention herein described the circumference of sprocket wheel 17 is twice as great as the circumference of sprocket wheel 23, so that the film engaging sprocket wheel 17 will be advanced twice as much at a time as the film engaging sprocket wheel 23. However, the amount of difference in size depends upon the number of series of negatives on the negative film. In two-color work such as herein described, the images of a single series of negatives are spaced a single picture space apart so that the negative film should be advanced two picture spaces at a time while the positive is being advanced a single space at a time. However, in applying this invention to three-color printing wherein the recurrent negatives of a series are disposed two picture spaces apart, the ratio of the sprocket wheels 17 and 23 should be such that the negative film is advanced three times as far at a time as the positive film.

In order accurately to position the respective films in the film gates so that the image on the negative may be accurately positioned upon a given area of the positive, means in addition to the film-advancing means are preferably provided to position the films in the film gates. Suitable means for this purpose comprises bell-cranks 37 and 38 pivotally mounted on brackets 39 and 40 and carrying at their upper ends pins 41 and 42 adapted accurately to fit in openings in the respective films and in openings 43 and 44 in the film gates. The openings in the film arranged to receive the pins 41 and 42 may either be the openings employed in advancing the films over the sprocket wheels 17 and 23, or additional holes especially provided for the purpose may be employed. Furthermore, the pins and openings may be so shaped that the pins engage one or both longitudinal sides of the openings without engaging the lateral sides of the openings, so that the film is only positioned longitudinally of the film gate, or the pins and openings may be so shaped that the pins engage only the lateral sides of the openings so that the film is only positioned laterally by the film positioning means; or, the pins and openings may be so shaped that the pins engage the openings on both the longitudinal and lateral sides of the openings so that the film is positioned both longitudinally and laterally. However, I preferably arrange the pins and openings so that the pins only engage the films on the forward sides, so that when advancing the films against the tension of springs connected to the feed reels such as customarily employed, the longitudinal position of the films in the film gates is determined by the pins engaging the forward sides of the openings and the springs on the feed reels tension the films in the film gates. With this arrangement the film advancing means is preferably so adjusted as to advance the films only to positions slightly in the rear of the proper positions so that when the pins 41 and 42 are advanced into the openings in the films, the films are advanced into proper position and held in this position by the tension of the springs at the feed reels.

The film positioning means is positively actuated by means of cam wheel 46 mounted on shaft 32 adjacent the gear wheel 34 and engaging rollers 47 and 48 mounted at the inner ends of the bell cranks 37 and 38. This cam wheel has four raised portions 49 and four depressed portions 50 so that the bell cranks are actuated four times for each revolution of the shaft 32, it being understood that the pins 41 and 42 are advanced into the openings 43 and 44 when the rollers are in contact with the depressed portions 50 of the cam wheel and that the pins are withdrawn when the rollers are in contact with the raised portions 49. The weight of the horizontal arms of the bell cranks and of the rollers is sufficient to keep the bell cranks in contact with the cam face, but springs may be employed if desired to supplement the weight of these members. Thus, the pins 41 and 42 are intermittently withdrawn from the openings 43 and 44 in synchronism with the advancement of the films. The raised portions of the cam wheel are so disposed with respect to the series of teeth on the gear wheel 34 as to withdraw the pins from the films just before the films are advanced and to insert the pins into the openings in the films just after the film-advancing means has come to rest.

A shutter 51 is disposed in the lens chamber 11 in alinement with the film gates and lens system 12 and is arranged to be driven by means of a set of bevel gears 52, a chain 53, shaft 54 and bevel gears 55 driven by shaft 32. The shutter has an opening of suitable extent and the gear ratios of the train of gears driving the shutter are such as to drive the shutter in synchronism with the film advancing means.

The means for projecting the images from the negative film N to the positive film P comprises a suitable light source 56 mounted in the lamp house 57 and the lens system 12 mounted on the partition 58 in the lens chamber. In order accurately to position the projected image on the positive film the lens system 12 is mounted on a frame 59 sliding horizontally in another frame 60, the frame 60 being arranged to slide vertically on the partition 58 in guides 61. The frame 60 is arranged to be vertically reciprocated by means of shaft 62 threaded into a lug 63 on the frame 60, a knurled head 64 or other suitable means being provided on the outside of the casing 11 to rotate the shaft. The frame 59 is arranged to be horizontally reciprocated by means of shaft 66 threaded into a lug 67 on the frame 59 and arranged to be rotated by means of a knurled head 68.

The lens system 12 is preferably arranged to be reciprocated along its axis in order properly to focus the projected image and suitable means for this purpose comprises a rack 69 mounted on the periphery of the tube 70 containing the lenses. The rack 69 meshes with a pinion 71 which is mounted on shaft 72, the latter being rotatably supported in the lugs 73 mounted on the sleeve 74 in which the tube 70 reciprocates. The shaft 72 is provided at its outer end with a knurled head 76 for reciprocating the lens tube.

Inasmuch as the lens 12 and frame 59 are vertically reciprocated by shaft 62 and frame 60, slots 77 and 78 are provided in the side of the casing 11 so that the shafts 66 and 72 may be vertically reciprocated along with the lens tube and frame 59. In order to prevent light escaping outwardly through these slots to the sensitized film P, a plate 79 is arranged to cover the slots, the plate having openings to receive the shafts and being arranged freely to slide vertically in guide members 81.

In addition to the means for vartically and laterally shifting the lens system, thereby accurately to position the projected image on the positive film, I preferably provide deflecting means in the form of plates 83 and 84 of refracting material, these plates being disposed in the path of the projected beam of light, one plate preferably being disposed on each side of the lens system. These refracting means are similar to those described in my prior Patent No. 1,208,490 granted Dec. 12, 1916, and comprise transparent plates of glass having parallel faces. Each of these is mounted in a frame 86 which is mounted in a second frame 87 so as to be rotated about the transverse axis of the latter frame. The frame 87 is mounted to rotate about its longitudinal axis by means of a shaft 88 rotating in a bearing 89, and a shaft 91 rotating in an opening in the casing 11. The inner frame 86 is arranged to be rotated by means of a shaft 92 which may be an extension of the trunnion 93 and which extends outwardly through a slot 94 in the casing 11. Knurled heads 95 and 96 or other suitable means are provided on the outside of the casing to rotate the respective frames 86 and 87. A plate 97 sliding in guides 98 is arranged to cover the slot 94 and thereby prevent light radiating outwardly through the lens chamber 11 to the sensitized film P. Thus, each of the prisms 83 and 84 are adapted to be universally adjusted, that is, they are adapted to be tilted in any direction. By rotating the head 95 the prism is rotated about one axis, by rotating the head 96 it is rotated about an axis at right angles to the first axis, and by combining the two motions the prisms may be tilted in any direction.

As fully described in my prior Patent No. 1,208,490, the effect of a prism such as 83 or 84 upon a projected beam of light is laterally to shift the beam without changing its direction. In other words, the effect of such a prism is to shift the virtual position of the image to be projected with respect to the lens system and with respect to the second film gate. When employing a prism which is universally adjustable a single prism positioned either between the negative film gate and the lens system or between the lens system and the positive film gate is sufficient to shift the projected image in any direction on the positive film and thereby accurately to position it upon the desired area of the film, for example, in accurate superposition with respect to the image previously printed thereon. Furthermore, when employing two prisms, as illustrated, it is unnecessary to mount each prism so that it can be rotated about two axes. inasmuch as one prism may be mounted to rotate about a vertical axis and the other prism may be mounted to rotate about an horizontal axis, so that one prism may be employed to shift the projected image in one direction and the other prism may be employed to shift the projected image in the other direction. Thus, the two prisms acting conjunctively function laterally to shift the position of the projected image in any direction.

In order accurately to position the projected image upon the positive film, I preferably provide a microscope 100 or other suitable means for viewing the projected image on the positive film. The microscope is preferably mounted on the outside of the film gate 14 in alinement with the film gate so that the projected image or a portion of the image can be viewed through the positive film. I have found that the emulsion on the positive film diffuses the projected light to such an extent that when viewing the image from the rearward side of the film substantially no direct rays pass through to the viewing means so that the image appears much the same as if viewed from the forward side of the film. The viewing means is of especial utility when printing an image in super-position to an image which has previously been rendered visible inasmuch as both images are clearly visible under such circumstances and the operator can determine with facility and with accuracy when the two or more images are in precise registry. In starting a new set of films through the apparatus one or more images may be printed out of register but by stopping the machine with the first image in the positive film gate the projected image can be accurately registered therewith so that the subsequent images will be in substantial registry. By viewing the images either continuously or at intervals, any gradual tendency for the images to get out of registry due to unequal shrinkage of one of the films can be gradually corrected as it tends to develop by means of either one or both of the prisms 83 and 84 or by means of the lateral adjustment of the lens system. The adjustment of the lens system is preferably employed for rough adjustments and one or both of the prisms are preferably employed for more delicate adjustments, so that by employing the two adjusting means conjunctively the projected image can be both quickly and accurately positioned.

Apparatus such as disclosed in Figs. 8 to 11 possesses the further advantage of affording means for regulating the size of the image printed on the positive film. As above explained, it is at times desirable to first print a series of images of a given size and later to print in superposition to the first series a second series of images which are complementary to the images of the first series and to print the second series of smaller size than the images of the first series so as to compensate for the shrinkage of the positive film during the interval between the two printing operations. With the latter embodiment of my invention the size of the projected images can readily be regulated by adjusting the lens system along its axis.

The operation of the apparatus shown in Figs. 8 to 11 will be clear from the above detailed description. The negative film bearing two or more series of complemental images having been produced, for example, by apparatus such as shown in Fig. 1, the film is fed through the printing apparatus in synchronism with a sensitized film but two or more picture spaces at a time so that a single series of images is printed in juxtaposition upon the positive film. The films are then removed from the apparatus, the positive film is developed and dyed, a second sensitized emulsion is applied to the positive film either on the same side or the opposite side to that of the first emulsion and the films are again fed through the apparatus in synchronism. However, the second series of the complemental images is projected to the second emulsion of the positive film in superposition to the first series, care being taken that the respective pairs of superposed images are complementary. In printing the second series accurate registry between the first and second series of images is obtained by means of the viewing apparatus 100 and the adjusting prisms or adjustable lens system.

It is to be understood that the words "complemental" and "complementary," as applied to a plurality of negatives or positives, are employed in the specification and claims to denote images which taken together constitute, represent, or are capable of producing an approximately complete picture and, when employed under proper conditions, a picture which represents the approximate colors of the original object field; and the words are not used in this connection necessarily to denote images which represent those phases of the object field which are complementary in color, although in two-color photography the colors to which the complemental images correspond are approximately complementary.

I claim:

1. The method of producing a color motion picture film having a plurality of series of complemental images in superposition therein, which method comprises producing on the film one series of images in predetermined size, treating the film in such manner that the images of the first series are changed to a different size, and then producing on the film in registration with the first series a second series of images corresponding in size to said different size instead of said predetermined size, whereby the images of the two series will not only be centered relatively to each other, but will be registered throughout their entire areas.

2. The method of producing a color motion picture film having a plurality of series of complemental images in superposition thereon, which method comprises exposing on a sensitized emulsion of the film one series of images in predetermined size, treating the film in such manner that the images of the first series are changed to a different size, exposing on another sensitized emulsion of the film in registration with the first series, a second series of images corresponding in size to said different size instead of said predetermined size, and then converting the second series into color images, whereby the images of the two series will not only be centered relatively to each other but will be registered throughout their entire areas.

3. The method of producing a color motion picture film having a plurality of series of complemental images in superposition thereon, which method comprises producing on the film one series of images in predetermined size, treating the film in such manner that the images of the first series are changed to a different size, and then producing on the film in registration with the first series a second series of images corresponding in size to said different size instead of said predetermined size, the corresponding images of the two series representing concomitant aspects of the object field from the said point of view, whereby the corresponding images of the two series will not only be centered relatively to each other but will also be coincident throughout their entire areas.

4. The method of producing a color motion picture film having a plurality of series of complemental images in superposition thereon, which method comprises exposing on a sensitized emulsion of the film one series of images of predetermined size, treating the film in such manner that the images of the first series are changed to a different size, exposing on another sensitized emulsion of the film in registration with the first series a second series of images corresponding in size to said different size instead of said predetermined size, the corresponding images of the two series representing concomitant aspects of the object field from the same point of view, whereby the corresponding images of the two series will not only be centered relatively to each other but will also be coincident throughout their entire areas.

5. The method of printing an image in accurate position upon sensitized means comprising projecting a beam of light through the image and thence through a focusing lens to form a projected image on the sensitized means, and deflecting the beam intermediate the lens and one of said images to secure said accurate positioning.

6. The method of printing an image in accurate position upon sensitized means comprising projecting a beam of light through the image and thence through a focusing lens to form a projected image on the sensitized means, and refracting the beam in one plane before passing through the lens and in a different plane after passing through the lens.

7. The method of printing an image in accurate position upon sensitized means comprising projecting a beam of light through the image and thence through a focusing lens to form a projected image on the sensitized means, and deflecting the beam in one plane before passing through the lens and in a substantially perpendicular plane after passing through the lens.

8. Motion picture printing apparatus comprising a relatively light tight lens chamber, film gates at different sides of the chamber, a lens system within the chamber in optical alinement with the film gates, means for projecting a beam of light through the film gates and lens system, the lens system being so arranged that an image in the first film gate will be focused on the film in the second film gate, and means without moving the lens system for accurately positioning the focused image on a definite area of the film in the second film gate.

9. In motion picture printing apparatus, the combination of means for positioning image-bearing means and sensitized means in spaced relationship, and means for projecting a beam of light from the image-bearing means to the sensitized means so as to print a latent image upon the latter corresponding to the image on the former, and means for laterally bending the beam of light without changing its direction so as accurately to position the latent image on the sensitized means.

10. In motion picture printing apparatus, the combination of means for positioning image-bearing and sensitized means in spaced relationship, means for projecting a beam of light from the image-bearing means to the sensitized means so as to print a latent image upon the latter corresponding to the image on the former, a transparent refracting body interposed between the image-bearing and sensitized means in the path of said beam of light, and means for tilting the refracting body with respect to the axis of said beam.

11. In motion picture printing apparatus, the combination of means for positioning image-bearing and sensitized means in spaced relationship, means for projecting a beam of light from the image-bearing means to the sensitized means so as to print a latent image upon the latter corresponding to the image on the former, transparent refracting body interposed between the image-bearing and sensitized means in the path of said beam of light, and universal adjusting means for tilting the refracting body in any direction with respect to the axis of said beam.

12. In motion picture printing apparatus, the combination of means for positioning imaging-bearing and sensitized means in spaced relationship, means for projecting a beam of light from the image-bearing means to the sensitized means so as to print a latent image upon the latter corresponding to the image on the former, transparent refracting bodies interposed between the image-bearing and sensitized means in the path of said beam of light, and means for tilting the refractive bodies in different directions mutually to displace the virtual position of the image on the image-bearing film laterally in any direction.

13. In motion picture printing apparatus, the combination of means for positioning image-bearing and sensitized means in spaced relationship, means for projecting a beam of light from the image-bearing means to the sensitized means so as to print a latent image upon the latter corresponding to the image on the former, the projecting means comprising a focusing lens system disposed between the image-bearing and sensitized means, and adjustable means between the image-bearing means and the lens system for laterally shifting the beam of light without changing its direction.

14. In motion picture printing apparatus, the combination of means for positioning image-bearing and sensitized means in spaced relationship, means for projecting a beam of light from the image-bearing means to the sensitized means so as to print a latent image upon the latter corresponding to the image on the former, the projecting means comprising a focusing lens system disposed between the image-bearing and sensitized means, and adjustable means between the lens system and the sensitized means for laterally shifting the beam of light without changing its direction.

15. In motion picture printing apparatus, the combination of means for positioning image-bearing and sensitized means in spaced relationship, means for projecting a beam of light from the image-bearing means to the sensitized means so as to print a latent image upon the latter corresponding to the image on the former, the projecting means comprising a focusing lens system disposed between the image-bearing and sensitized means, and adjustable refracting means between the respective image-bearing and sensitized means, and the lens system arranged to be tilted in different directions mutually to displace the position of the latent image laterally in any direction.

16. In motion picture apparatus, the combination of a lens system, means disposed in the optical path of said system for refracting a beam of light passing therethrough, and means for tilting the refracting means relatively to the optical path in a plurality of directions.

17. In motion picture apparatus, the combination of a lens system, means disposed in the optical path of said system for refracting a beam of light passing therethrough, and means for tilting the refracting means relatively to the optical path in any direction.

18. In motion picture apparatus, the combination of a lens system, a plane parallel plate of glass disposed transversely of the optical path of said lens system, and means for tilting said plate relatively to the optical axis in a plurality of directions.

Signed by me at Boston, Massachusetts, this eighth day of December, 1916.

DANIEL F. COMSTOCK.